(12) United States Patent
Lakshminarasimhan et al.

(10) Patent No.: US 11,275,685 B1
(45) Date of Patent: Mar. 15, 2022

(54) SYSTEM AND METHOD OF OPTIMIZING ROLLBACKS

(71) Applicant: Kyndryl, Inc., New York, NY (US)

(72) Inventors: Sriram Lakshminarasimhan, Chennai (IN); Prasanna Veeraraghavan, Chennai (IN); Chandan Kumar Vishwakarma, Hazaribagh (IN); Sundar Sarangarajan, Chennai (IN)

(73) Assignee: Kyndryl, Inc., New York, NY (US)

( * ) Notice: Subject to any disclaimer, the term of this patent is extended or adjusted under 35 U.S.C. 154(b) by 62 days.

(21) Appl. No.: 17/017,757

(22) Filed: Sep. 11, 2020

(51) Int. Cl.
  *G06F 12/08* (2016.01)
  *G06F 12/0804* (2016.01)

(52) U.S. Cl.
  CPC .. *G06F 12/0804* (2013.01); *G06F 2212/1032* (2013.01); *G06F 2212/202* (2013.01)

(58) Field of Classification Search
  None
  See application file for complete search history.

(56) References Cited

U.S. PATENT DOCUMENTS

| | | | |
|---|---|---|---|
| 6,321,234 B1* | 11/2001 | Debrunner | G06F 16/217 |
| 6,769,074 B2 | 7/2004 | Vaitzblit | |
| 2002/0007363 A1 | 1/2002 | Vaitzblit | |
| 2003/0056143 A1* | 3/2003 | Prabhu | G06F 12/0804 |
| | | | 714/13 |
| 2013/0275388 A1* | 10/2013 | Gower | G06F 11/1474 |
| | | | 707/684 |
| 2015/0019496 A1 | 1/2015 | Stewart | |
| 2016/0232185 A1* | 8/2016 | Broeder | G06F 16/2365 |
| 2017/0185493 A1 | 6/2017 | Graefe | |
| 2020/0034251 A1 | 1/2020 | Antonopoulos | |
| 2020/0242036 A1* | 7/2020 | Kolli | G06F 12/0831 |

\* cited by examiner

*Primary Examiner* — Tracy C Chan
(74) *Attorney, Agent, or Firm* — Ken Han, Esq.; Kevin P. Radigan, Esq.; Heslin Rothenberg Farley & Mesiti P.C.

(57) ABSTRACT

A computer-implemented method of optimizing data rollback is disclosed. The method receives a request to perform a task on a disk storage. The method initiates the task by reading a plurality of data pages from the disk storage to a database buffer. Each of the plurality of data pages on the database buffer are modified to form a plurality of dirty pages. In response to reaching and/or exceeding a database buffer threshold, a portion of the plurality of dirty pages on the database buffer are externalized to a rollback buffer. In response to reaching and/or exceeding a rollback buffer threshold, a subset of the portion of the plurality of dirty pages on the rollback buffer are externalized to the disk storage. The method detects a task cancelling activity prior to completion of the task; and performs a rollback of the plurality of dirty pages to a pre-task state.

20 Claims, 7 Drawing Sheets

SYSTEM AND METHOD OF OPTIMIZING ROLLBACKS

BACKGROUND

Aspects of the present invention relate generally to multitier architecture systems, and more particularly to decreasing time delays associated with large transactions using multitier architecture systems.

Multitier architecture systems (i.e., n-tiered architecture) separate an application into logical components (i.e., tiers) that each have an assigned role or responsibility. Separating the application responsibilities into multiple tiers allows for an increase in scalability and processing capabilities. While various n-tier architecture systems exist, one of the most common is the three-tiered architecture system. A three-tiered architecture has a presentation tier, a logic tier, and a data tier.

The presentation tier is the topmost level of the architecture. This tier provides relevant application information in a user interface to the user and can receive user input. Examples of a presentation tier can include webpages that allow for the browsing and purchasing of merchandise. The logic tier maintains the main application logic and allows for the coordination of the business logic to control the functionality of the application. The logic tier can act as an intermediary between the presentation tier and the data tier. For example, the logic tier can accept user input from the presentation tier and send the data to the data tier. The data tier is responsible for data management of the database server. The data tier can contain the data storage logic and can retrieve data from database servers and direct the data to the logic tier where it can be processed by relevant applications.

While all tiers within the n-tiered architecture systems generally communicate with each other, information and data stored in the third tier (i.e., the data tier) is often protected from direct access by the users. In order to maintain data integrity, n-tiered architectures systems have implemented various methods to limit potential data losses, particularly in situations where a n-tiered architecture system is processing large data transactions.

SUMMARY

According to one embodiment of the present invention, a computer-implemented method of optimizing data rollback is disclosed. The computer-implemented method includes receiving a request to perform a task on at least one table on a disk storage. The computer-implemented method further includes initiating the task by reading a plurality of data pages from the at least one table to a database buffer. The computer-implemented method further includes modifying, based on the task, each of the plurality of data pages on the database buffer to form a plurality of dirty pages. The computer-implemented method further includes externalizing, in response to reaching and/or exceeding a database buffer threshold, a portion of the plurality of dirty pages on the database buffer to a rollback buffer. The computer-implemented method further includes externalizing, in response to reaching and/or exceeding a rollback buffer threshold, a subset of the portion of the plurality of dirty pages on the rollback buffer to the disk storage. The computer-implemented method further includes detecting a task cancelling activity prior to completion of the task. The computer-implemented method further includes responsive to detecting the task cancelling activity, performing a rollback of the plurality of dirty pages to a pre-task state.

BRIEF DESCRIPTION OF THE DRAWINGS

The drawings included in the present invention are incorporated into, and form part of, the specification. They illustrate embodiments of the present invention and, along with the description, serve to explain the principles of the disclosure. The drawings are only illustrative of certain embodiments and do not limit the disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present invention relate generally to n-tiered architecture systems, and more particularly to decreasing time delays associated with the rollback of large tasks (e.g., transactions) using n-tiered architecture systems. While the present invention is not necessarily limited to such applications, various aspects of the disclosure may be appreciated through a discussion of various examples using this context.

N-tiered architecture systems can be used to perform various applications and can be incorporated in different types of Enterprise Resource Planning (ERP) systems. ERP systems can be generally defined as a type of business management software containing a suite of integrated applications that can allow a business to collect, store, manage and interpret data from various business activities. ERP systems can track various resources for business organizations including, but not limited to, purchase orders, payroll, and customer information.

Often, applications found in an ERP system require long running uncommitted tasks (e.g., transactions). During these long running uncommitted tasks, most or all of the data undergoing the task or operations is inaccessible/unavailable to the business organization or user. While time consuming, in some situations taking several hours to complete, these tasks are a necessary component of ERP systems and ensure proper resource allocation. During these tasks, certain situations can arise that result in cancelling the partially completed task. Because these tasks are uncommitted, the data associated with the tasks remains inaccessible/unavailable until a rollback of the data to its pre-task state is complete (i.e., as if the task was never initiated). Since these tasks are traditionally composed of large amounts of data, traditional rollback operations can add several hours of delay before the data (in its pre-task state) is available and accessible to the user.

Embodiments of the present invention are directed to methods of reducing the amount of time associated with performing rollback operations, particularly in long running uncommitted tasks. Embodiments disclosed herein can be configured to provide an additional buffer (e.g., rollback buffer) that acts as a temporary storage for modified/updated data during the task and minimizes and/or delays the amount of data externalized to disk storage. In these embodiments, if a task is interrupted and/or cancelled, data contained on the rollback buffer and other database buffers can quickly and more easily be rolled-back to its pre-task state than traditional methods of rolling-back data already externalized to disk storage.

Figure 1:
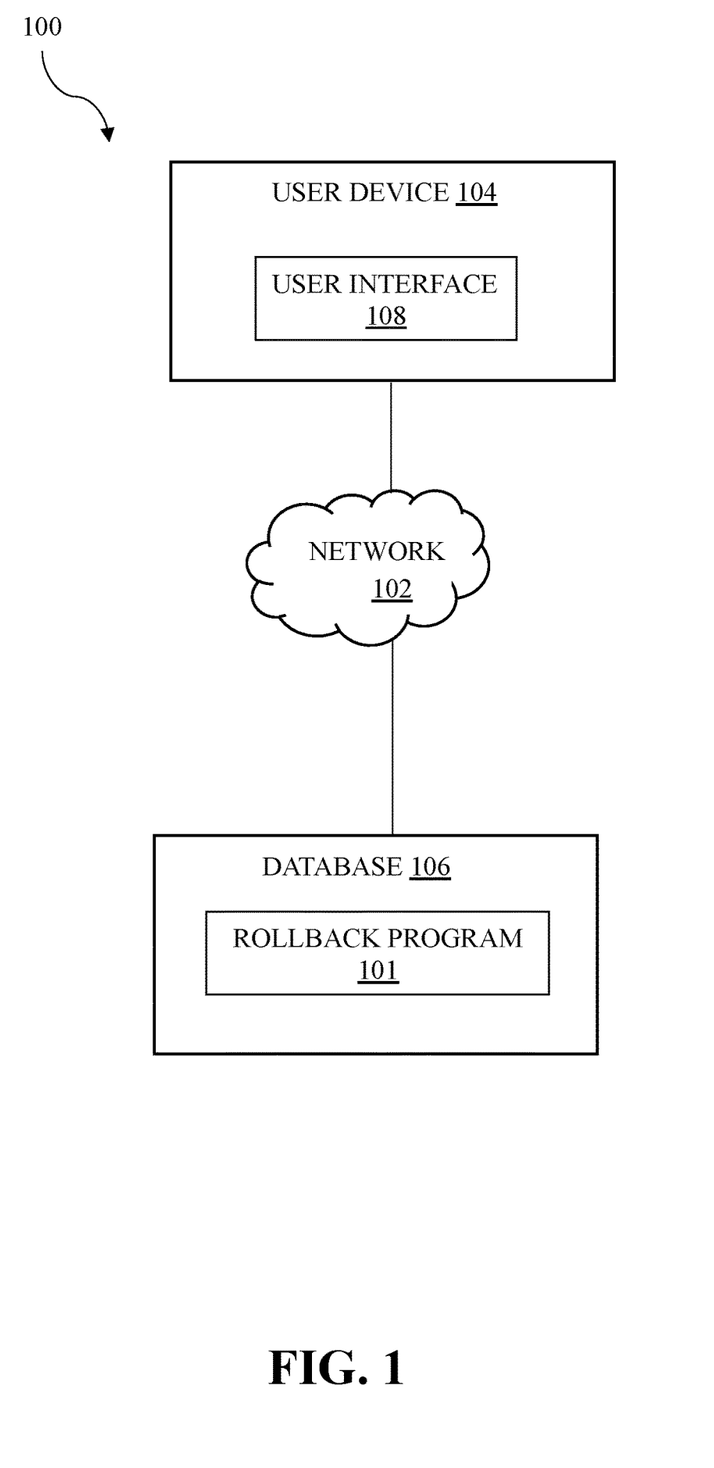
FIG. 1 illustrates a network diagram depicting networking environment 100 in accordance with at least one embodiment of the present invention.

Turning now to the figures, FIG. 1 illustrates an example networking environment 100 in accordance with at least one embodiment of the present invention. FIG. 1 provides an illustration of only one implementation and does not imply any limitations with regard to the environments in which different embodiments may be implemented. Many modifications to the depicted environment may be made by those skilled in the art without departing from the scope of the invention as recited by the claims.

Networking environment 100 can include network 102, user device 104, and database 106. Network 102 can be any type or combination of networks. For example, network 102 can include, but is not limited to, one or more of: (i) personal area network (PAN), (ii) local area network (LAN), (iii) metropolitan area network (MAN), (iv) wide area network (WAN), (v) wireless local area network (WLAN), (vi) storage area network (SAN), (vii) enterprise private network (EPN), or (viii) virtual private network (VPN). Network 102 can refer to an IP network, and may include one or more wired and/or wireless networks that are capable of receiving and transmitting data, voice, and/or video signals, including multimedia signals that include voice, data, and video information. For example, the different tiers of n-tier architecture 106 can communicate with various user devices 104 (e.g. tablets, laptops, smartphones, portable terminals, conferencing device components, user device 104, etc.) over the Internet. In general, network 102 can be any combination of connections and protocols that will support communications between rollback program 101, user device 104, database 106, and any other devices (not shown) within networking environment 100.

In some embodiments, network 102 can be implemented within a cloud computing environment, or using one or more cloud computing services. Consistent with various embodiments, a cloud computing environment can include a network-based, distributed data processing system that provides one or more cloud computing services. Further, a cloud computing environment can include many computers (e.g., hundreds or thousands of computers or more) disposed within one or more data centers and configured to share resources over network 102. Cloud computing is discussed in greater detail in regard to FIGS. 5A-6.

User device 104 can be a laptop computer, tablet computer, smartphone, smartwatch, or any other computing device that allows for a user to interact with and execute the methods and/or techniques described herein. User device 104 can represent any programmable electronic device or combination of programmable electronic devices, capable of executing machine readable program instructions and as well as capable of communicating with other computing devices (not shown) within networking environment 100 via network 102.

In embodiments, user device 104 can include a user interface 108. User interface 108 provides an interface between rollback program 101, each user device 104 and database 106. User interface 108 can be a graphical user interface (GUI), a web user interface (WUI) or any other suitable interface for a user to interact with and execute the methods and/or techniques described herein.

While FIG. 1 depicts networking environment 100 having distinct components (i.e., user device 108 and database 106 being separately situated, in some embodiments networking environment 100 is configured, at least in part, in a client-server architecture, such as a n-tiered architecture (e.g., three-tiered architecture). In these embodiments, various functions of networking environment 100 can be partitioned and functionally separated into traditional tiered architecture functions.

For example, in embodiments where networking environment 100 is a three-tiered architecture, networking environment could have a presentation tier, a logic tier and a data tier. In these embodiments, the presentation tier could include user interface 108 which allows a user to interact with networking environment 100 via user device 104. In embodiments having a three-tiered architecture, a logic tier, not represented in FIG. 1, could contain the functional business logic used to drive an applications capabilities (e.g., ERP system applications). In addition, the logic tier could act as an intermediary between the presentation tier and the last tier; and the data tier to interact with database 106.

In embodiments, database 106 can include a single database or any number of databases, of any size, configured to provide proper data management of uncommitted tasks. In embodiments, database 106 can configure disk storage space and allot memory to create caches and virtual memory objects (e.g., buffer pools). Alternatively, in some embodiments, database 106 can represent a data tier in a n-tiered architecture and can include all the necessary components required by a data tier for proper data management. In embodiments, database 106 can include any number of data tables of information and is capable of storing large amounts of data in one or more memory arrays. Memory arrays are generally structured in tables of rows and columns to hold data pages (i.e., database unit of storage). In embodiments, database 106 can reside on a single server, on multiple servers within a cloud computing environment, on user device 104, and/or on the same physical system or virtualized system as rollback program 101.

In embodiments, database 106 can include rollback program 101. Although rollback program 101 is depicted in FIG. 1 as integrated with database 106, in other embodiments, rollback program 101 can be remotely located from database 106. For example, rollback program 101 could be a component of the logic tier of a n-tier architecture that directly interacts with the data tier or database 106.

Figure 2:
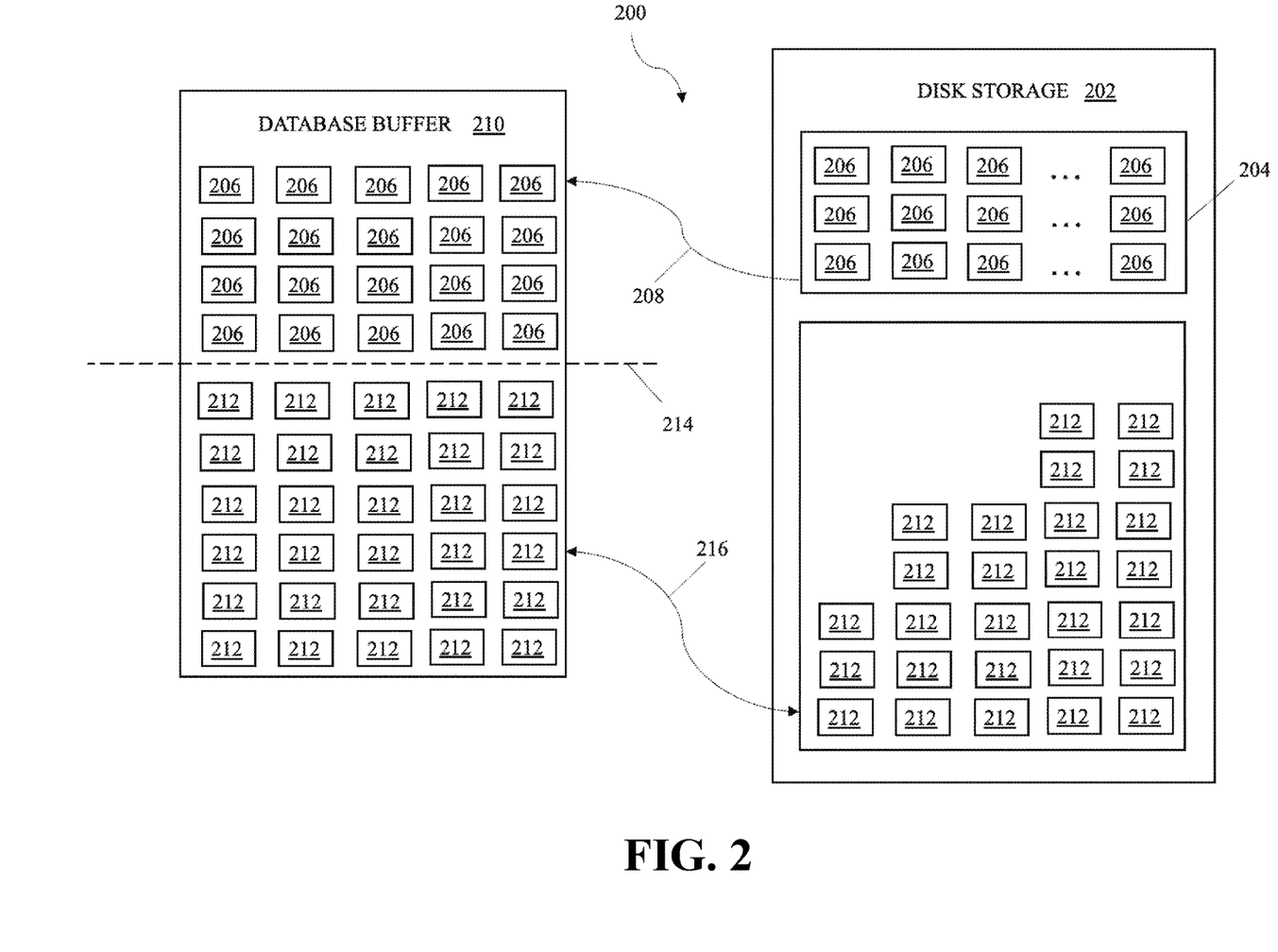
FIG. 2 illustrates an embodiment of task 200 during an exemplary rollback operation in accordance with at least one embodiment of the present invention.

Turning now to FIG. 2, an illustration of an exemplary uncommitted task (i.e., without commit) 200 is depicted. FIG. 2 provides an illustration of only one implementation and does not imply any limitations with regard to the environments in which different embodiments may be implemented. Many modifications to the depicted environment may be made by those skilled in the art without departing from the scope of the invention as recited by the claims.

In embodiments, a task can include any number of operations where data from a database experiences a write operation that modifies or updates data. In FIG. 2, disk storage 202 can include at least one database. In some embodiments, disk storage 202 can be a component of a data tier of a n-tier architecture. Disk storage 202 can be comprised of tables of data, such as table 204, having columns and rows of data. Rows of data can be organized into blocks to form a unit of data storage called a data page. One or more databases, particularly those containing data pages associated with long running uncommitted tasks (e.g., ERP system transactions), can have tables having millions of columns and millions of rows of data. As such, the millions of rows associated with table 204 can form a plurality of data pages 206. Each of the plurality of data pages 206 can be configured to be any size, but are often found in 2, 4, 8, 16, and 32 KB sizes.

Returning to FIG. 2, a task can be initiated on the plurality of data pages 206 in table 204 on disk storage 202. Once initiated, the plurality of data pages 206 can be read (direction arrow 208) to a database buffer 210. Database buffer 210 can be an area of memory that has been allocated by the database for the purposes of caching data pages from the database tables. One of the most resource intensive operations in computer systems is the reading and writing of data from disk storage 202. This is based at least in part on the ease with which data on a disk can be accessed. Database buffer 210 can be configured to be significantly smaller than disc storage 202. For example, while disk storage 202 could have a data volume of 100 GB, database buffer 210 could have a data volume around 2-3 GB. Keeping database buffer 210 small can allow read data pages to be easily and quickly accessible during the task. Database buffer 210 can be configured to be any size and hold any amount of data. In various embodiments, a balance is often struck between keeping the database buffer 210 small enough to ensure data pages can be easily accessed while also ensuring the space is large enough for the assigned task.

In embodiments, particularly in long running uncommitted tasks, the amount of data and data pages 206 in table 204 exceeds the size of database buffer 210. As a result, not all of data pages 206 can be read to database buffer 210 at the same time. As data pages 206 are written to database buffer 210, task 200 can begin to modify and/or update data pages 206. Once task 200 has modified or updated data page 206, data page 206 becomes a dirty page 212. In embodiments, once a data page 206 is modified by task 200 and becomes a dirty page 212, the dirty pages 212 are not immediately externalized to disk storage 202. In these embodiments, the number of dirty pages 212 on database buffer 210 can increase until a first threshold 214 is reached and/or exceeded. In these embodiments, dirty pages 212 can be externalized and written (see directional arrows 216) to disk storage 202. While in some embodiments all of the dirty pages 212 can be externalized to disk storage 202, in other embodiments the dirty pages 212 can be externalized until the count of dirty pages 212 is sufficiently below the first threshold 214.

Externalizing or writing the dirty pages 212 to disk storage 202 can free up space to allow more data pages 206 to be read from table 204. These newly read data pages 206 can then be modified/updated by task 200 to form additional dirty pages 212, thereby allowing task 200 to progress. In these embodiments, each time the first threshold 214 is reached, dirty pages 212 can be externalized and written to storage disk 202. This can continue until the task is complete and all dirty pages 212 are externalized to disk storage 202.

In embodiments having more than one task or a read operation simultaneously executed where each task or operation is using the same database buffer (e.g., database buffer 210), each task's respective dirty pages (or browsed pages if a read operation) are counted together when determining if the first threshold 214 has been reached or exceeded. As a result, in embodiments where multiple tasks or read operations are being executed, externalization of dirty pages (e.g., dirty pages 212) to disk storage 202 occurs more frequently, causing an increase in the number of pages written to disk storage 202. While in many situations externalizing data to disk storage 202 is a desirable outcome, in other situations, externalizing large portions of data to disk storage 202 prior to task completion can have damaging consequences, particularly when associated with long running uncommitted tasks such as that described in FIG. 2.

In embodiments where a long running uncommitted task is cancelled or abandoned after partial completion, data (i.e., data pages 206) remains inaccessible to a user or business organization until the data has been returned, or rolled-back to its pre-task state. Returning to FIG. 2, if task 200 was cancelled prior to completion, not only would all of the modifications made to dirty pages 212 on database buffer 210 have to be rolled-back (e.g., to data page 206), but all of the dirty pages 212 externalized to disk storage 202 would also need to be rolled-back. The rollback of dirty pages 212 on database buffer 210 is an easier and quicker process, based at least in part on the dirty pages being easily accessible on database buffer 210. Dirty pages 212 externalized to disk storage 202 are usually not as easily or quickly accessible as data located on database buffer 210, based, at least in part, on the large size of the disk storage 202. Often, dirty pages 212 externalized to disk storage 202 must be read back to database buffer 210 (see directional arrow 216) to revert the dirty pages to their pre-task state (i.e., data pages 206) in order to complete a rollback or backout. The more dirty pages 212 externalized to disk storage 202, the longer it takes to complete a rollback of long running uncommitted tasks. As discussed generally herein, data undergoing a task is not only unavailable to users for the duration of the task, but also for the length of time necessary to rollback the data to its original pre-task state. An inability to access important data for several hours can have serious financial and business related implications.

Embodiments of the present invention are directed to minimizing the duration and time delay associated with backing out the modified data pages (i.e., dirty pages) during the rollback, based at least in part, on minimizing the amount of dirty pages externalized to the database with the use of a rollback buffer.

Figure 3:
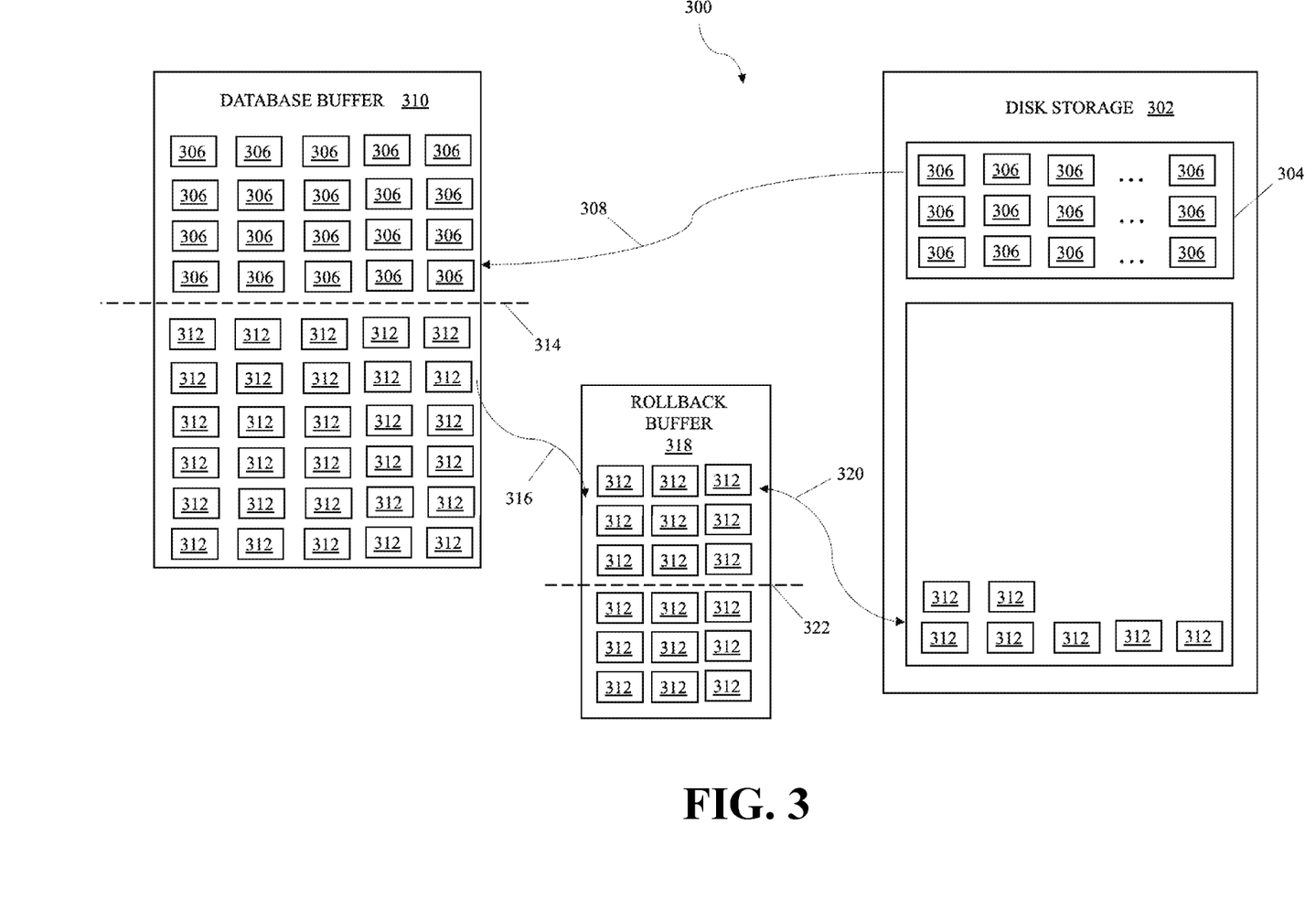
FIG. 3 illustrates an embodiment of task 300 during an exemplary rollback operation in accordance with at least one embodiment of the present invention.

Turning now to FIG. 3, an illustration of an exemplary uncommitted task 300 is depicted in accordance with at least one embodiment of rollback program 101 during a rollback or backout. FIG. 3 has similar structures and configurations as those disclosed in regard to FIG. 2 and can include at least all or fewer than all of the same or similar components disclosed in reference to FIG. 2. FIG. 3 provides an illustration of only one implementation and does not imply any limitations with regard to the environments in which different embodiments may be implemented. Many modifications to the depicted environment may be made by those skilled in the art without departing from the scope of the invention as recited by the claims.

In embodiments, rollback program 101 can receive a request to perform task 300 on at least one table 304 of data (e.g., data pages 306) stored on disk storage 302 associated with a database (e.g., database 106). While embodiments disclosed herein often refer to task 300 as a long running uncommitted task or transaction, embodiments can include any task where writing operations (e.g., adding new data, modifying data, and/or updating data) are performed on data stored on disk storage 302.

In some embodiments, rollback program 101 can create and allocate memory for database buffer 310. While in some embodiments rollback program 101 can create database buffer 310 to be a particular pre-determined size, in other embodiments, rollback program 101 can control and determine the size of the database buffer 310 created. In these embodiments, rollback program 101 can consider the type of transaction task 300 to be performed (e.g., accessing customer lists, updating account information, etc.), the amount of data (i.e., data pages) in the at least one table 304 to be processed, and/or the accessibility of the data on database buffer 310 in order to configure the size of database buffer 310.

In embodiments, rollback program 101 can determine if task 300 is a rollback eligible task. In some embodiments, rollback program 101 is configured to receive additional information regarding whether task 300 is a rollback eligible task. This additional information can include, but is not limited to, receiving input from an administrator identifying that task 300 is a rollback eligible task or having each task pre-identified as a rollback eligible task or not. In other embodiments, rollback program 101 can identify whether a task is a rollback eligible task based on the amount of data comprised in table 304, whether task 300 is with or without a commit instruction, and the projected length of time necessary to complete task 300.

In embodiments where task 300 is determined or identified as a rollback eligible task, rollback program 101 can use rollback buffer 318. Rollback buffer 318 can be any type of temporary storage area in memory, configured to hold blocks of data rows or data pages (e.g., data page 306 or dirty pages 312) during the execution of a task or transaction. In embodiments, rollback program 101 can configure rollback buffer 318 to only receive dirty pages 312 associated with task 300. Rollback buffer 318 can be a type of database buffer and may be configured in a similar manner as database buffer 310. In some embodiments, rollback program 101 can create and/or allocate memory for the creation of a rollback buffer. Similar to database buffer 310, rollback buffer 318 can be a predetermined size or rollback program 101 can independently determine an optimized amount of allotted memory. While FIG. 3 illustrates rollback buffer 318 as being smaller in size compared to database buffer 310, rollback buffer 318 can be the same size or larger than database buffer 310.

In embodiments, once database buffer 310 and rollback buffer 318 are configured, task 300 begins by reading (see directional arrow 308) data pages 306 from table 304 onto database buffer 310. In this exemplary embodiment, table 304 can contain data pages representing millions of rows of data. As discussed generally herein, database buffer 310 is traditionally only allocated a small amount of memory to ensure data is easily and quickly accessible (e.g., database buffer 310 could have 2-3 GBs while disk storage 302 could have 100 GBs). As a result, in some embodiments, the amount of data pages 306 in table 304 to be processed by task 300 can exceed the size or memory allotted to database buffer 304. As data pages 306 begin to fill database buffer 310, task 300 can begin to modify or update each of the data pages 306. After a data page 306 is modified or updated by task 300 it becomes a dirty page 312.

As task 300 continues to modify data pages 306, more dirty pages 312 can be formed on database buffer 310. In embodiments, rollback program 101 can establish first threshold 314 on database buffer 310. In these embodiments, first threshold 314 can indicate that a particular count or storage amount of modified data pages (i.e., dirty pages 306) has been reached or exceeded.

If first threshold 314 is reached or exceeded, rollback program 101 can externalize (see directional arrow 316) at least some of the dirty pages 312 from database buffer 310 and write them to rollback buffer 318. While any amount of dirty pages 312 can be externalized to rollback buffer 318, the amount of dirty pages 312 externalized or written to rollback buffer 318 should be of an amount sufficient to allow additional data pages 306 to be read from table 304 to database buffer 310 to be processed by task 300.

In embodiments, first threshold 314 of database buffer 310 can also be considered reached/exceed (i.e., triggered) during a database system checkpoint. A system checkpoint can generally be understood to be a restore point in the database and can be used in some instances to create backups. System checkpoints can be issued periodically in database systems or can be triggered by specific events including, but not limited, to subsystem parameter checkpoint frequency, active log switch, and/or subsystem restarts. When a system checkpoint triggers first threshold 314, rollback program 101 can also externalize dirty pages 312 from database buffer 310 to rollback buffer 318. In embodiments, first threshold 314 can be considered reached/exceeded in a variety of ways including, but not limited to, based on the amount of dirty pages 312 reaching/exceeding first threshold 314, when a system checkpoint is observed during task 300, or a combination thereof. These embodiments ensure database buffer 310 does not become full and unable to continue task 300.

In embodiments, as task 300 continues to process data pages 306, rollback program 101 can continue to externalize dirty pages 312 from database buffer 310 to rollback buffer 318 as first threshold 316 is repeatedly reached or exceeded and/or triggered by system checkpoints. As a result of the repeated externalization of dirty pages 312 from database buffer 310 to rollback buffer 318, rollback buffer 318 begins to fill its allotted space (i.e., available space in rollback buffer 318) with dirty pages 312. Without rollback buffer 318, dirty pages would be directly externalized (see directional arrows 320) from database buffer 310 to disk storage 302 (as referenced in FIG. 3). To prevent frequent externalization of dirty pages 312 on rollback buffer 318 and to avoid rollback buffer 318 from filling up its allotted memory, rollback program 101 can configure a second threshold 322 that can dictate when dirty pages 312 are externalized from rollback buffer 318 to disk storage 310.

While in some embodiments, rollback program 101 can configure second threshold 322 to be a specific percentage or ratio of free allotted memory to occupied memory, in other embodiments second threshold can be considered reached/exceeded (i.e., triggered) by the number of system checkpoints. In these embodiments, rollback program 101 can be configured to monitor the count of system checkpoints for the duration of task 300. While dirty pages 312 on database buffer 310 can be externalized to rollback buffer 318 each time a system checkpoint is issued, second threshold 322 can be based on the number of system checkpoints and can only be reached or exceeded after a particular number of system checkpoints are observed during task 300. While in some embodiments second threshold 322 can be selectively set to any number of observed system checkpoints, in other embodiments second threshold 322 can be set in multiples based on a total number of system checkpoints. In some embodiments, second threshold 322 may be set in multiples of 50 system checkpoints. For example, if second threshold 322 is set to 50/100 system checkpoints, dirty pages 312 on rollback buffer 318 can be externalized to disk storage 302 after every 50 system checkpoints are observed by rollback program 101. In embodiments, second threshold 322 can be considered reached/exceeded in a variety of ways including, but not limited to, based on the amount of dirty pages 312 reaching/exceeding second threshold 314, when a particular number of system checkpoints are observed during task 300, or a combination thereof. When second threshold 322 is reached or exceed, rollback program 101 can externalize all or less than all of the dirty pages 312 on rollback buffer 318 to disk storage 302. In some embodiments, rollback program 101 can dictate an optimized amount of dirty pages to externalize to disk storage, based, at least in part, on the amount of data to be processed by task 300, each time second threshold 322 is reached or exceeded. Such embodiments can ensure the majority of dirty pages 312 are not externalized to disk storage 310 prior to task 300 completion.

In embodiments, rollback program 101 can detect a task cancelling activity. Task cancelling activity can be any activity that prevents the completion of task 300 and can include, but is not limited to, a user administratively cancelling task 300, a computer system error, and/or system power failure. If a task cancelling activity is not detected by rollback program 101, then task 300 can complete the transaction on table 304 data and externalize the modified/dirty pages 312 to disk storage 302. If a task cancelling activity is detected, rollback program 101 can begin a rollback or back out of the modified pages (i.e., dirty pages 312) and return data pages 306 to their pre-task form or state, as if task 300 had not been initiated.

In embodiments, rollbacks or data backouts can be more quickly performed on database buffer 310 and rollback buffer 318 than rollbacks or backouts made on disk storage 302. This can be based, at least in part, on the accessibility of dirty pages 312 located on each database buffer 310, rollback buffer 318 and disk storage 302. In general, data located on database buffer 310 and rollback buffer 318 can be easily accessed (i.e., more so than disk storage 302) based at least in part on each database buffer 310 and rollback buffer 318 having a smaller amount of allotted memory than disk storage 302. As discussed herein, the smaller amount of memory allotted to each the database buffer 310 and rollback buffer 318 the more easily data (e.g., dirty pages 312) can be found by task 300 to be backed-out or rolled-back. Data located on disk storage 302 can require a significant amount of time to access because disk storage 302 can be significantly larger than either database buffer 310 or rollback buffer 318. In addition, because modifying data directly on disk storage 302 can be time consuming, particularly with long running uncommitted transactions, the process of backing out the modifications made to dirty pages 312 on disk storage 302 can be more quickly performed by reading those dirty pages 312 on disk storage 302 to either database buffer 310 or rollback buffer 318 to make the rollbacks.

In embodiments where rollback buffer 318 is used and rollback program 101 detects a task cancelling activity, the majority of the dirty pages 312 modified by task 300 can be located on the rollback buffer and database buffer with only a small percentage of modified pages (i.e., dirty pages 312) having been externalized or written to disk storage 302. Keeping the majority of dirty pages 312 on database buffer 310 and rollback buffer 318 allows for faster data retrieval and processing than if the majority of dirty pages 312 were located on the disk storage 302; both during a task and a rollback. Time associated with rollbacks or backing-out dirty pages 312 after a task cancelling activity is detected can be reduced in a variety of ways. As discussed herein, when the majority of dirty pages 312 processed by task 300 are located on rollback buffer 318 (and/or database buffer 310), dirty pages 312 are quickly and easily accessible for the rollback operation. Time associated with a rollback is further reduced by minimizing the number of dirty pages 312 that have to be transferred from disk storage 302 to the buffer (either database buffer 310 or rollback buffer 318) in order to be rolled-back. The process of finding dirty pages 312 externalized to a usually large disk storage 302 and transferring the dirty pages 312 back to a buffer can be an energy and time consuming operation. By minimizing the number of dirty pages 312 on disk storage 302 that need transferring to a buffer during a rollback can significantly reduce the time associated with rollbacks.

In embodiments, rollback program 101 can monitor the data backout or rollback and can determine when the data in table 304 has been completely restored to is pre-task 300 state. In these embodiments, rollback program 101 is completed and access to the data associated with table 304 can again become accessible to users and other applications or tasks.

Figure 4:
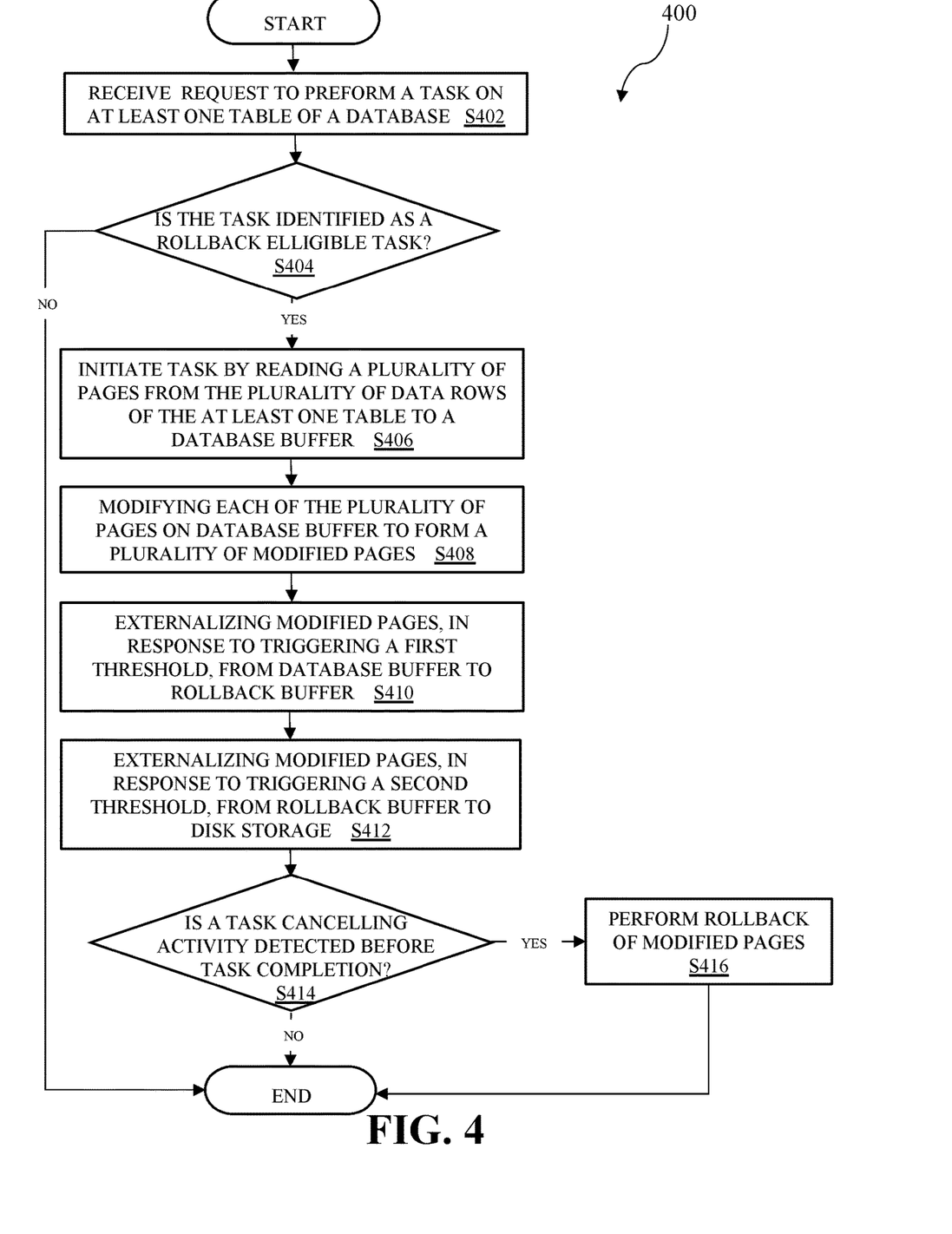
FIG. 4 depicts a flowchart diagram showing operational steps of rollback program 101 in accordance with at least one embodiment of the present invention.

Turning now to FIG. 4, a flowchart diagram depicting operational method 400 steps performed by rollback program 101, in accordance with at least one embodiment of the present invention, is shown. Method 400 can allow for a more efficient rollback of data associated with uncommitted tasks, particularly with long running tasks. FIG. 4 provides an exemplary embodiment and does not imply any limitations with regard to the environments in which different embodiments may be implemented. Many modifications to the depicted environment may be made by those skilled in the art without departing from the scope of the invention as recited by the claims.

In embodiments, method 400 can begin at operational step S402, where rollback program 101 receives a request to perform a task on at least one table of a database. In some embodiments, database buffer 310 can be created when a request to perform a task is received. In these embodiments, memory can be allocated for database buffer 310 based, at least in part, on the type of task requested. For example, a task requiring numerous operations or large amounts of data pages could allocate a larger amount of memory to increase the size of database buffer 310 (i.e., to reduce externalization). Alternatively, a task requiring that data pages be accessed quickly could allocate a smaller amount of memory and produce a smaller sized database buffer 310. In other embodiments, database buffer 310 can be configured prior to the initiation of the task at a pre-determined size.

Method 400 proceeds to decision step S404. At decision step S404, rollback program 101 determines if the task has been identified as a rollback eligible task. If, at decision step S404, rollback program 101 determines that the task is not a rollback eligible task (decision step "NO" branch), the task is completed and the method 400 ends. If, at decision step S404, rollback program 101 determines that the task is a rollback eligible task (decision step "YES" branch) method 400 proceeds to operational step S406.

At operational step S406, rollback program 101 can initiate the task by reading a plurality of pages from the plurality of data rows of the at least one table on to the database buffer. Method 400 proceeds to operational step S408. At operational step S408, rollback program 101 begins to modify each of the plurality of pages on the database buffer, as dictated by the task, to form a plurality of modified pages. Method 400 proceeds to operational step S410. At operational step S410, rollback program 101 externalizes modified pages from the database buffer to the rollback buffer in response to reaching/exceeding a first threshold. Method 400 proceeds to operational step S412. At operational step S412, rollback program 101 externalizes modified pages from the rollback buffer to the disk storage in response to reaching/exceeding a second threshold.

Method 400 proceeds to decision step S414. At decision step S414, rollback program 101 determines if a task cancelling activity is detected before the task is competed. If, at decision step S414, rollback program 101 determines that no task cancelling activity is detected prior to task completion (decision step "NO" branch), then the task is completed and method 400 ends. In embodiments where a task is completed, the modified pages can be externalized (i.e., from both the database buffer and the rollback buffer) and committed to the disk storage. If, at decision step S414, rollback program 101 can determine that task cancelling activity has been detected prior to task completion (decision step "YES" branch), method 400 proceeds to operational step S416. At operational step S416, rollback program 101 can perform a rollback of the modified data pages (i.e., dirty pages 312) on disk storage 302, database buffer 310, and rollback buffer 318. In embodiments, rollback program 101 can transfer dirty pages 312 previously externalized to disk storage 302 to rollback buffer 318, where dirty pages 312 are rolled back to their pre-task 300 state. In these embodiments, the dirty pages can be more quickly accessed on the rollback buffer 318 and the rollback can be accomplished faster. Once the rollback in operational step S416 is completed, method 400 ends.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of portion independence in that the consumer generally has no control or knowledge over the exact portion of the provided resources but may be able to specify portion at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5A:
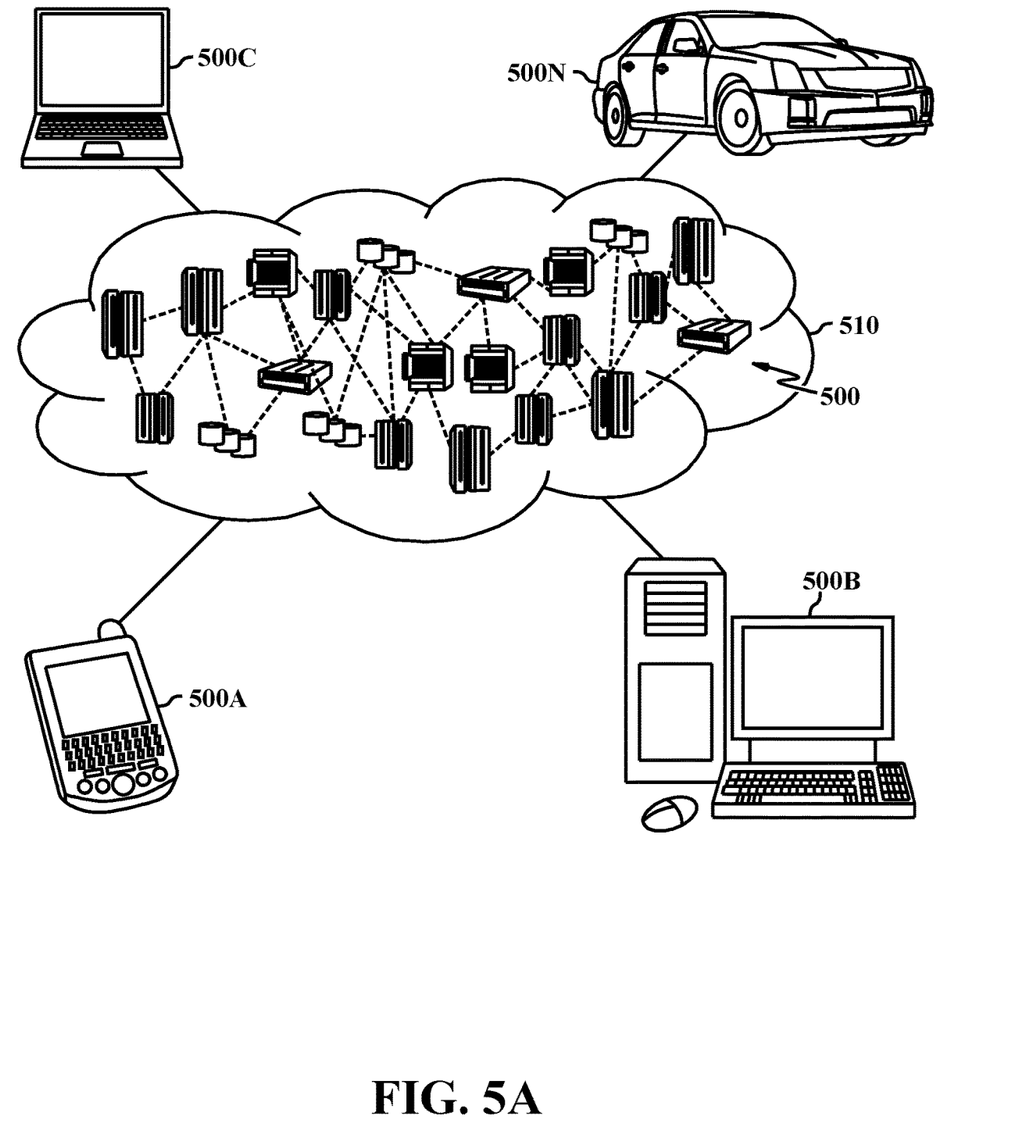
FIG. 5A illustrates a cloud computing environment in accordance with at least one embodiment of the present invention.
Figure 5B:
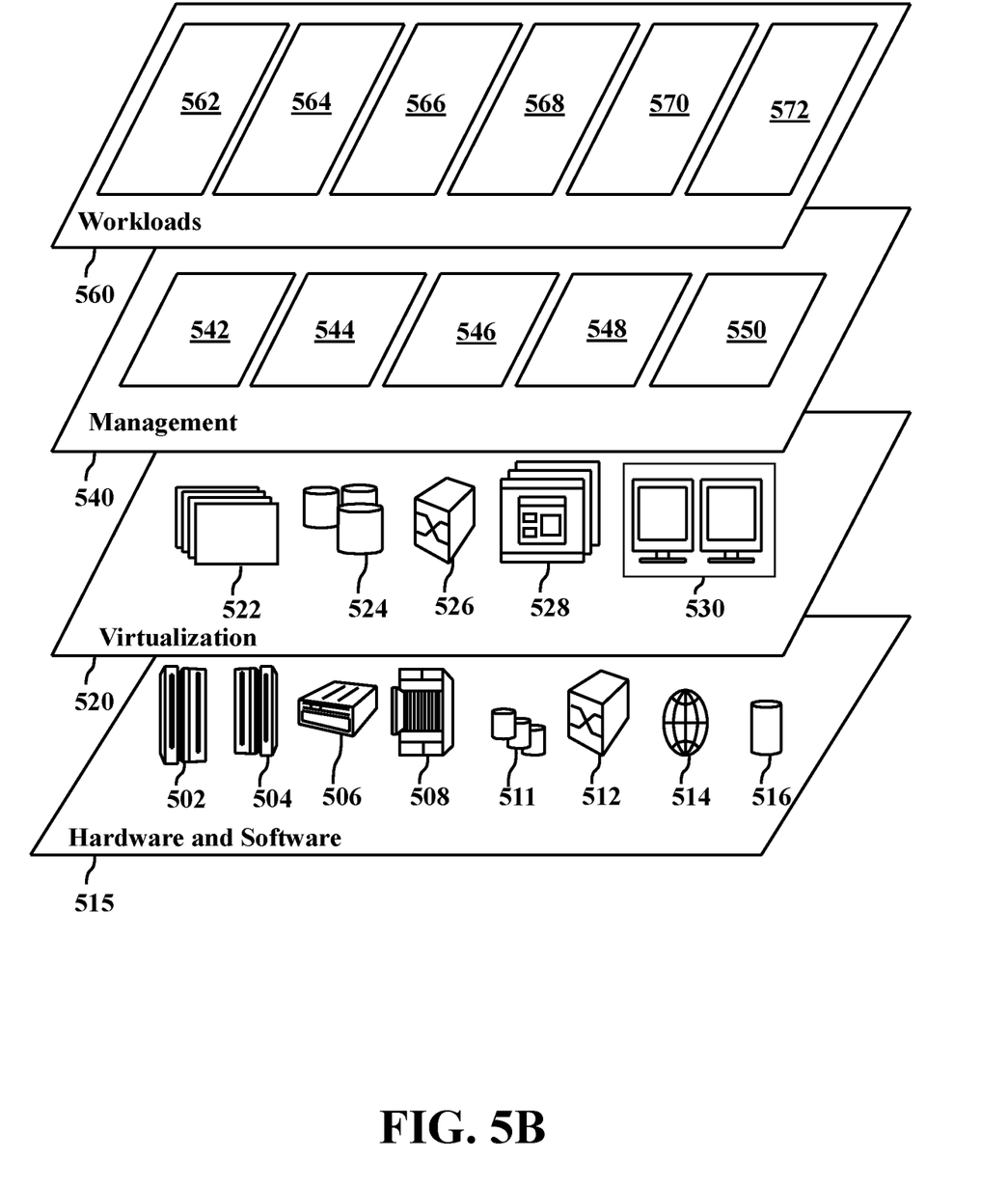
FIG. 5B illustrates abstraction model layers in accordance with embodiments of the present invention.

Referring now to FIG. 5A, illustrative cloud computing environment 510 is depicted. As shown, cloud computing environment 510 includes one or more cloud computing nodes 500 with which local computing devices used by cloud consumers, such as, for example, personal digital assistant (PDA) or cellular telephone 500A, desktop computer 500B, laptop computer 500C, and/or automobile computer system 500N may communicate. Nodes 500 may communicate with one another. They may be grouped (not shown) physically or virtually, in one or more networks, such as Private, Community, Public, or Hybrid clouds as described hereinabove, or a combination thereof. This allows cloud computing environment 510 to offer infrastructure, platforms and/or software as services for which a cloud consumer does not need to maintain resources on a local computing device. It is understood that the types of computing devices 500A-N shown in FIG. 5A are intended to be illustrative only and that computing nodes 500 and cloud computing 500 and cloud computing environment 510 can communicate with any type of computerized device over any type of network and/or network addressable connection (e.g., using a web browser).

Referring now to FIG. 5B, a set of functional abstraction layers provided by cloud computing environment 510 (FIG. 5A) is shown. It should be understood in advance that the components, layers, and functions shown in FIG. 5B are intended to be illustrative only and embodiments of the disclosure are not limited thereto. As depicted below, the following layers and corresponding functions are provided.

Hardware and software layer 515 includes hardware and software components. Examples of hardware components include: mainframes 502; RISC (Reduced Instruction Set Computer) architecture based servers 504; servers 506; blade servers 508; storage devices 511; and networks and networking components 512. In some embodiments, software components include network application server software 514 and database software 516.

Virtualization layer 520 provides an abstraction layer from which the following examples of virtual entities may be provided: virtual servers 522; virtual storage 524; virtual networks 526, including virtual private networks; virtual applications and operating systems 528; and virtual clients 530.

In one example, management layer 540 may provide the functions described below. Resource provisioning 542 provides dynamic procurement of computing resources and other resources that are utilized to perform tasks within the cloud computing environment. Metering and Pricing 544 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 546 provides access to the cloud computing environment for consumers and system administrators. Service level management 548 provides cloud computing resource allocation and management such that required service levels are met. Service Level Agreement (SLA) planning and fulfillment 550 provide pre-arrangement for, and procurement of, cloud computing resources for which a future requirement is anticipated in accordance with an SLA.

Workloads layer 560 provides examples of functionality for which the cloud computing environment may be utilized. Examples of workloads and functions which may be provided from this layer include: mapping and navigation 562; software development and lifecycle management 564; virtual classroom education delivery 566; data analytics processing 568; transaction processing 570; and rollback operations 572.

Figure 6:
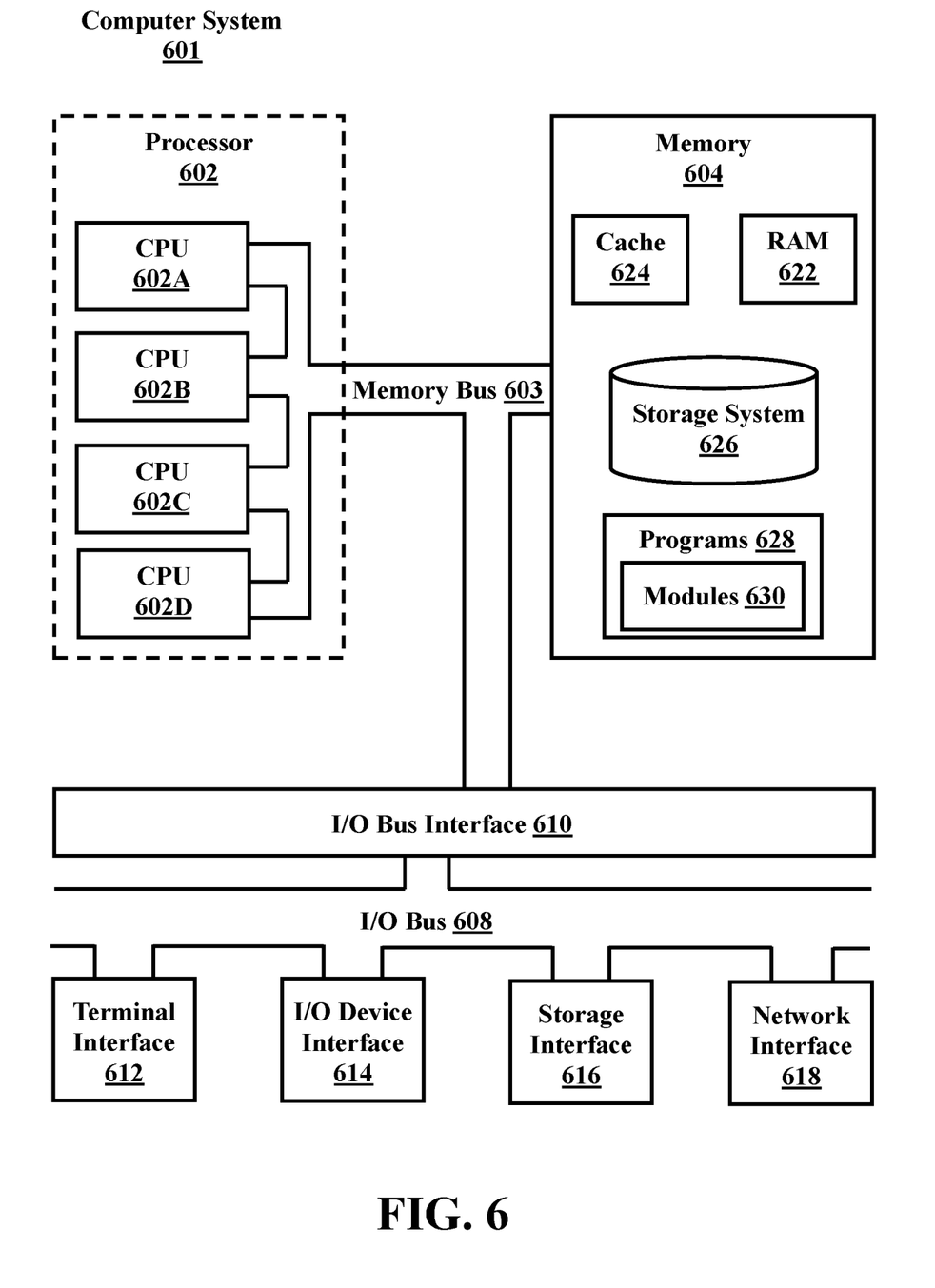
FIG. 6 illustrates a high-level block diagram of an example computer system 601 that may be used in implementing one or more of the methods, tools, and modules, and any related functions, described herein, in accordance with at least one embodiment of the present invention.

FIG. 6, illustrated is a high-level block diagram of an example computer system 601 that may be used in implementing one or more of the methods, tools, and modules, and any related functions, described herein (e.g., using one or more processor circuits or computer processors of the computer), in accordance with embodiments of the present invention. In some embodiments, the major components of the computer system 601 may comprise one or more Processor 602, a memory subsystem 604, a terminal interface 612, a storage interface 616, an I/O (Input/Output) device interface 614, and a network interface 618, all of which may be communicatively coupled, directly or indirectly, for inter-component communication via a memory bus 603, an I/O bus 608, and an I/O bus interface unit 610.

The computer system 601 may contain one or more general-purpose programmable central processing units (CPUs) 602A, 602B, 602C, and 602D, herein generically referred to as the CPU 602. In some embodiments, the computer system 601 may contain multiple processors typical of a relatively large system; however, in other embodiments the computer system 601 may alternatively be a single CPU system. Each CPU 602 may execute instructions stored in the memory subsystem 604 and may include one or more levels of on-board cache.

System memory 604 may include computer system readable media in the form of volatile memory, such as random access memory (RAM) 622 or cache memory 624. Computer system 601 may further include other removable/non-removable, volatile/non-volatile computer system storage media. By way of example only, storage system 626 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 604 can include flash memory, e.g., a flash memory stick drive or a flash drive. Memory devices can be connected to memory bus 603 by one or more data media interfaces. The memory 604 may include at least one program product having a set (e.g., at least one) of program modules that are configured to carry out the functions of various embodiments.

One or more programs/utilities 628, each having at least one set of program modules 630 may be stored in memory 604. The programs/utilities 628 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 628 and/or program modules 630 generally perform the functions or methodologies of various embodiments.

Although the memory bus 603 is shown in FIG. 6 as a single bus structure providing a direct communication path among the CPUs 602, the memory subsystem 604, and the I/O bus interface 610, the memory bus 603 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 610 and the I/O bus 608 are shown as single respective units, the computer system 601 may, in some embodiments, contain multiple I/O bus interface units 610, multiple I/O buses 608, or both. Further, while multiple I/O interface units are shown, which separate the I/O bus 608 from various communications paths running to the various I/O devices, in other embodiments some or all of the I/O devices may be connected directly to one or more system I/O buses.

In some embodiments, the computer system 601 may be a multi-user mainframe computer system, a single-user system, or a server computer or similar device that has little or no direct user interface, but receives requests from other computer systems (clients). Further, in some embodiments, the computer system 601 may be implemented as a desktop computer, portable computer, laptop or notebook computer, tablet computer, pocket computer, telephone, smartphone, network switches or routers, or any other appropriate type of electronic device.

It is noted that FIG. 6 is intended to depict the representative major components of an exemplary computer system 601. In some embodiments, however, individual components may have greater or lesser complexity than as represented in FIG. 6, components other than or in addition to those shown in FIG. 6 may be present, and the number, type, and configuration of such components may vary.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present invention has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A computer-implemented method of optimizing data rollback, comprising:
   receiving a request to perform a task on at least one table on a disk storage;
   initiating the task by reading a plurality of data pages from the at least one table to a database buffer;
   modifying, based on the task, each of the plurality of data pages on the database buffer to form a plurality of dirty pages;
   externalizing, in response to reaching and/or exceeding a database buffer threshold, a portion of the plurality of dirty pages on the database buffer to a rollback buffer;
   externalizing, in response to reaching and/or exceeding a rollback buffer threshold, a subset of the portion of the plurality of dirty pages on the rollback buffer to the disk storage;
   detecting a task cancelling activity prior to completion of the task; and
   responsive to detecting the task cancelling activity, performing a rollback of the plurality of dirty pages to a pre-task state.

2. The computer-implemented method of claim 1, wherein performing a rollback comprises transferring the subset of the portion of the plurality of dirty pages externalized to the disk storage to the rollback buffer.

3. The computer-implemented method of claim 1, wherein the database buffer threshold is reached and/or exceeded based, at least in part, on a number of the plurality of dirty pages modified on the database buffer.

4. The computer-implemented method of claim 1, wherein the database buffer threshold is reached and/or exceeded based, at least in part, on observing a single system checkpoint.

5. The computer-implemented method of claim 1, wherein the rollback buffer threshold is reached and/or exceeded based, at least in part, on observing a predetermined number of the system checkpoints.

6. The computer-implemented method of claim 1, wherein determining the task is a rollback eligible task, wherein the dirty pages associated with the rollback eligible task can be externalized to the rollback buffer.

7. The computer-implemented method of claim 6, wherein in an additional task and the rollback eligible task use the database buffer, wherein only the dirty pages associated with the rollback eligible task are externalized to the rollback buffer.

8. A computer system of optimizing data rollback, the computer system comprising:
   one or more computer processors;
   one or more computer readable storage media;
   computer program instructions;
   the computer program instructions being stored on the one or more computer readable storage media for execution by the one or more computer processors; and
   the computer program instructions including instructions to:
   receive a request to perform a task on at least one table on a disk storage;
   initiate the task by reading a plurality of data pages from the at least one table to a database buffer;
   modify, based on the task, each of the plurality of data pages on the database buffer to form a plurality of dirty pages;
   externalize, in response to reaching and/or exceeding a database buffer threshold, a portion of the plurality of dirty pages on the database buffer to a rollback buffer;
   externalize, in response to reaching and/or exceeding a rollback buffer threshold, a subset of the portion of the plurality of dirty pages on the rollback buffer to the disk storage;
   detect a task cancelling activity prior to completion of the task; and
   responsive to detecting the task cancelling activity, perform a rollback of the plurality of dirty pages to a pre-task state.

9. The computer system of claim 8, wherein performing a rollback comprises transferring the subset of the portion of the plurality of dirty pages externalized to the disk storage to the rollback buffer.

10. The computer system of claim 8, wherein the database buffer threshold is reached and/or exceeded based, at least in part, on a number of the plurality of dirty pages modified on the database buffer.

11. The computer system of claim 8, wherein the database buffer threshold is reached and/or exceeded based, at least in part, on observing a single system checkpoint.

12. The computer system of claim 8, wherein the rollback buffer threshold is reached and/or exceeded based, at least in part, on observing a predetermined number of the system checkpoints.

13. The computer system of claim 8, wherein determining the task is a rollback eligible task, wherein the dirty pages associated with the rollback eligible task can be externalized to the rollback buffer.

14. The computer system of claim 13, wherein in an additional task and the rollback eligible task use the database buffer, wherein only the dirty pages associated with the rollback eligible task are externalized to the rollback buffer.

15. A computer program product for optimizing data rollback, the computer program product comprising one or more computer readable storage media and program instructions stored on the one or more computer readable storage media, the program instructions including instructions to:

receive a request to perform a task on at least one table on a disk storage;

initiate the task by reading a plurality of data pages from the at least one table to a database buffer;

modify, based on the task, each of the plurality of data pages on the database buffer to form a plurality of dirty pages;

externalize, in response to reaching and/or exceeding a database buffer threshold, a portion of the plurality of dirty pages on the database buffer to a rollback buffer;

externalize, in response to reaching and/or exceeding a rollback buffer threshold, a subset of the portion of the plurality of dirty pages on the rollback buffer to the disk storage;

detect a task cancelling activity prior to completion of the task; and responsive to detecting the task cancelling activity, perform a rollback of the plurality of dirty pages to a pre-task state.

16. The computer program product of claim 15, wherein performing a rollback comprises transferring the subset of the portion of the plurality of dirty pages externalized to the disk storage to the rollback buffer.

17. The computer program product of claim 15, wherein the database buffer threshold is reached and/or exceeded based, at least in part, on a number of the plurality of dirty pages modified on the database buffer.

18. The computer program product of claim 15, wherein the database buffer threshold is reached and/or exceeded based, at least in part, on observing a single system checkpoint.

19. The computer program product of claim 15, wherein the rollback buffer threshold is reached and/or exceeded based, at least in part, on observing a predetermined number of the system checkpoints.

20. The computer program product of claim 15, wherein determining the task is a rollback eligible task, wherein the dirty pages associated with the rollback eligible task can be externalized to the rollback buffer.

* * * * *